H. R. HUGHES.
ROTARY BORING DRILL.
APPLICATION FILED NOV. 1, 1913.
1,124,242.
Patented Jan. 5, 1915.
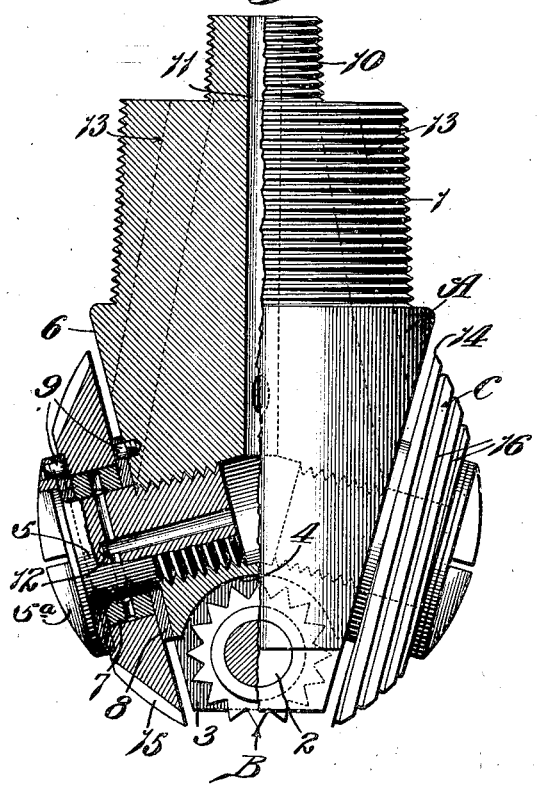
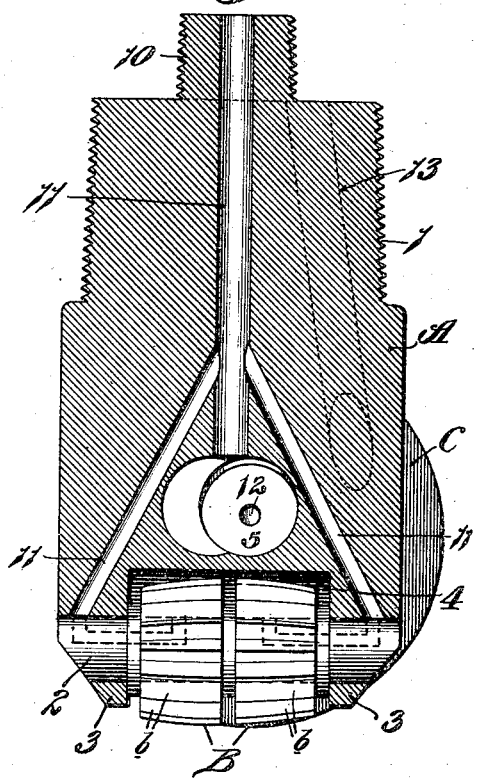
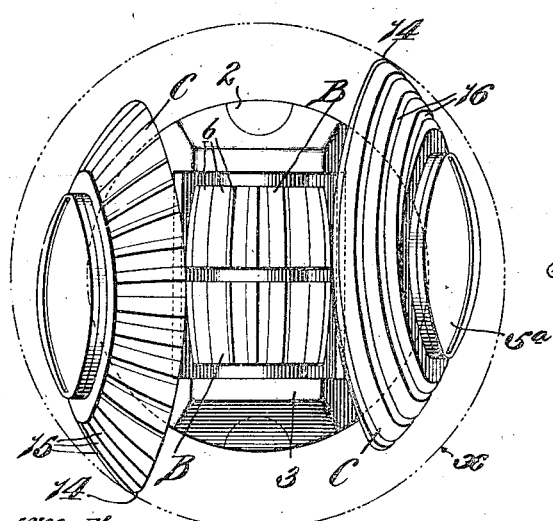
Witnesses:
Geo. R. Ladson
C. M. Badger
Inventor,
Howard R. Hughes.
By Bakewell & Church, Attys.

UNITED STATES PATENT OFFICE.

HOWARD R. HUGHES, OF HOUSTON, TEXAS.

ROTARY BORING-DRILL.

1,124,242.  Specification of Letters Patent.  Patented Jan. 5, 1915.

Application filed November 1, 1913. Serial No. 798,655.

*To all whom it may concern:*

Be it known that I, HOWARD R. HUGHES, a citizen of the United States, residing at Houston, Texas, have invented a certain new and useful Improvement in Rotary Boring-Drills, of which the following is a full, clear, and exact description, such as will enable others skilled in the art to which it appertains to make and use the same.

This invention relates to rotary boring drills that are used for drilling wells, and particularly to drills of the type that comprise substantially disk-shaped cutters, and which are particularly adapted for drilling in comparatively soft formations such, for example, as gumbo, shale, hard clay and soft rock.

The main object of my present invention is to provide a rotary drill of the type referred to which comprises crushing rollers for disintegrating the material at the bottom of the hole, and disk-shaped cutters for shearing off the material at the side of the hole and also for disintegrating the material at the bottom of the hole that lies outside of the zone of said crushing rollers.

Another object is to provide an efficient rotary boring drill that can be manufactured at a low cost and which is sufficiently rugged or strong enough to successfully withstand the strains to which it is subjected when in service.

Other objects and desirable features of my invention will be hereinafter pointed out.

Figure 1 of the drawings is a side elevational view, partly in vertical section, of a rotary drill constructed in accordance with my invention; Fig. 2 is a bottom plan view of said drill; and Fig. 3 is a vertical cross sectional view of said drill showing the crushing rollers in elevation.

Referring to the drawings which illustrate the preferred form of my invention, A designates the head of a drill which preferably consists of a block of metal provided at its upper end with a screw-threaded portion 1 for connecting the drill to the hollow drill stem or tubular-shaped operating member, not shown, through which the water is introduced into the hole so as to flush out the disintegrated material. Said head is provided with crushing rollers B that crush and pulverize the material at the bottom of the hole, and also with disk-shaped cutters C that shear off the material at the side of the hole and also disintegrate the material on the bottom of the hole that lies outside of the zone of the crushing rollers B. In the preferred form of my invention as herein shown, the crushing rollers B are rotatably mounted on a horizontally-disposed shaft 2 that extends transversely across the lower end of the head and which is mounted in bearings 3 on the head, as shown in Fig. 3, said crushing rollers being preferably provided with teeth $b$ that extend longitudinally of the rollers. A pocket or opening 4 is formed in the lower end of the head to receive the rollers B, and if desired, said rollers may be tapered in opposite directions so that they will form a concaved or dish-shaped surface at the bottom of the hole which tends to center the drill and prevent it from wabbling in the hole. The cutters C are substantially disk-shaped and are rotatably mounted on spindles 5 that project downwardly and outwardly from two oppositely-disposed flat bearing surfaces 6 on the head which incline downwardly and inwardly toward the longitudinal axis of the head, as shown in Fig. 1, the cutters C herein shown being substantially plano-convex shaped and arranged with their flat inner sides presented toward the head so that their outer tapered sides will lie beyond the sharp shearing edges that act on the side of the hole. The lower portions of the cutters C converge inwardly toward the longitudinal axis of the head, and the spindles 5 on which said cutters are mounted are offset slightly with relation to the center line of the head, as shown in Fig. 2, so that the rear edges of the cutters C will not drag against the side of the hole when the drill is in operation. Any suitable type of spindle may be used for connecting the cutters C to the head but I prefer to use spindles that are screwed into the head, as shown in Fig. 1, and which are provided at their outer ends with enlarged heads $5^a$ that lap over the outer faces of the cutters C. Bushings 7 of bronze or other suitable material, are preferably arranged between the spindles 5 and the cutters C, and if desired, washers 8 may be arranged between the inner sides of the cutters C and the flat bearing surfaces 6 on the head and also between the outer faces of said cutters and the enlarged heads $5^a$ on the spindles, said washers being preferably connected to the head A and to the enlarged heads on the spindles by means of screws or other suitable fastening devices 9 so as to prevent them from rotating with the cutters C. The head A is provided at its upper end with a collar 10 for supporting a lubricant-holder, not shown, but similar to that disclosed in my prior Patent No. 930,759, dated August 10, 1909, and ducts 11 and 12 are formed in the head and in the spindles 5, respectively, so as to conduct the lubricant to the bearing surfaces for the cutters C and rollers B. The head A is, of course, provided with the usual water-holes 13 for discharging streams of water from the lower end of the head so as to flush out the material which the cutters and rollers disintegrate. The edges of the cutters C are preferably backed off or tapered, as shown in Figs. 1 and 2, so that each cutter will be provided with a sharp cutting edge 14 for shearing off the material from the side of the hole, and the portions of said cutters which lie back of or beyond the cutting edges 14 may be formed in various ways so as to crush and pulverize the material at the bottom of the hole that lies outside of the zone of the crushing rollers B.

In the form of my invention herein shown, one of the cutters C is provided on its edge with cutting teeth 15 that extend transversely across the edge of the cutter, and the other cutter is provided on its edge with a spiral groove 16 that extends circumferentially around the edge of the cutter.

When the drill is in operation the crushing rollers B crush and pulverize the material at the bottom of the hole, and the cutters C shear off the material at the side of the hole, indicated by the broken line x in Fig. 2, and also disintegrate the material at the bottom of the hole that lies outside of the zone of the crushing rollers B. In view of the fact that the cutters C are so mounted that only the forward edges of same act on the side of the hole, the inner edges 14 of said cutters will remain sharp from the constant rubbing action on the side of the hole, and the portions of the edges of said cutters which lie back of or beyond the cutting edges 14 will not wear rapidly on account of the fact that they do not drag against the side of the hole.

While I have herein illustrated my improved drill as being provided with two substantially disk-shaped cutters, one of which has transverse chisel-teeth 15 and the other a spiral groove that extends circumferentially around the edge of the cutter, it will, of course, be understood that the particular type of cutting surfaces on the cutters C is immaterial so far as my broad idea is concerned, as my invention, broadly stated, consists in a rotary boring drill provided with crushing rollers for disintegrating the material at the bottom of the hole and substantially disk-shaped cutters that disintegrate the material outside of the zone of said crushing rollers and which also shear off the material at the side of the hole and maintain the clearance for the head.

A drill of the construction above-described is rugged and sufficiently strong to successfully withstand the strains to which it is subjected when in service; it comprises only a few parts of simple design and therefore can be manufactured at a low cost; it can be kept thoroughly lubricated when it is in operation, and it is particularly adapted for drilling in soft formations owing to the fact that there is sufficient clearance around the head and around the cutters to enable the disintegrated material to be flushed out of the hole.

Having thus described my invention, what I claim as new and desire to secure by Letters Patent is:

1. In a rotary boring drill the combination of crushing rollers for acting on the material at the center of the bottom of the hole and substantially disk-shaped cutters arranged with their lower portions inclined inwardly and provided with sharp edges for shearing off the material from the side of the hole and also crushing portions that disintegrate the material at the bottom of the hole lying outside of the zone where said sharp edges act on the bottom of the hole.

2. A rotary boring drill comprising crushing rollers for acting on the material at the bottom of the hole, and substantially disk-shaped inclined cutters provided with sharp edges for shearing off the material from the side of the hole, said disk-shaped cutters having crushing surfaces which act on the material at the bottom of the hole that lies outside of the zone of said crushing rollers and outside of the zone where said sharp edges act on the bottom of the hole.

3. A rotary boring drill comprising substantially plano-convex disk-shaped cutters arranged in an inclined position so that the lower portions of same converge inwardly toward the longitudinal axis of the drill, the convexed surfaces of said cutters acting to crush the material at the bottom of the hole that lies outside of the zone where the sharp edges of said cutters act on the bottom of the hole, and crushing rollers arranged between said cutters and at approximately right angles to same for disintegrating the material at the bottom of the hole.

4. A rotary boring drill provided with oppositely-disposed disk-shaped cutters whose lower portions incline inwardly toward the longitudinal axis of the drill, said cutters having sharp edges that shear off the material at the side of the hole without dragging against the side of the hole and also having crushing portions that disintegrate the material on the bottom of the hole outside of the point where said sharp edges act on the bottom of the hole, and crushing rollers extending transversely of the drill between said cutters and rotating about an axis that is disposed at approximately right angles to the axes of rotation of said cutters.

5. A rotary boring drill comprising a head, crushing rollers on said head that rotate about a horizontal axis which extends diametrically across the lower end of the head, and inclined disk-shaped cutters of substantially plano-convex shape rotatably mounted on said head on opposite sides of said crushing rollers for shearing off the material at the side of the hole, the convexed surfaces of said cutters operating to crush the material at the bottom of the hole outside of the point where the sharp edges of the cutters act on the bottom of the hole.

6. A rotary boring drill comprising a head, oppositely-disposed spindles that project outwardly and downwardly from said head, substantially plano-convex disk-shaped cutters rotatably mounted on said spindles and arranged with their flat inner sides presented toward the head, the convexed surfaces of said cutters constituting crushing portions that disintegrate the material on the bottom of the hole lying outside of the point where the sharp edges of said cutters dig into the bottom of the hole, and a rotatable crushing device on said head arranged at approximately right angles to said cutters and extending transversely of the head between said cutters.

7. A rotary boring drill comprising a head, oppositely-disposed spindles that project outwardly and downwardly from said head, substantially plano-convex disk-shaped cutters rotatably mounted on said spindles in such a manner that the sharp edges of same shear off the material at the side of the hole, the convexed surfaces of said cutters constituting crushing portions that disintegrate the material on the bottom of the hole lying outside of the point where the sharp edges of said cutters dig into the bottom of the hole, and a rotatable crushing device on said head arranged between said cutters and extending diametrically across the head at approximately right angles to the axes of rotation of said cutters.

8. A rotary boring drill comprising a head, a horizontally-disposed rotatable crushing device that extends transversely of the head, and an approximately disk-shaped inclined cutter rotatably mounted on the head for shearing off the material at the side of the hole, the axis of rotation of said disk-shaped cutter being disposed at approximately right angles to said crushing device and said cutter having a crushing portion that disintegrates the material at the bottom of the hole lying outside of the zone where the sharp edge of the cutter acts on the bottom of the hole.

9. A rotary boring drill comprising a head provided in its lower end with a pocket, a rotatable crushing device in said pocket for acting on the bottom of the hole, and substantially plano-convex disk-shaped cutters rotatably mounted in inclined positions on the sides of the head and disposed at approximately right angles to said crushing device for shearing off the material at the side of the hole, the convexed surfaces of said cutters crushing the material at the bottom of the hole outside of the zone where the sharp edges of the cutters act on the bottom of the hole.

10. A rotary boring drill comprising a head provided in its lower end with a pocket, a rotatable crushing device in said pocket for acting on the bottom of the hole, and substantially disk-shaped cutters rotatably mounted on the sides of the head at approximately right angles to said crushing device for shearing off the material at the side of the hole, said cutting devices having tapered portions lying beyond the sharp edges of same that disintegrate the material at the bottom of the hole that lies outside of the point where the sharp edges of the cutters act on the bottom of the hole.

11. A rotary boring drill comprising a head, a horizontally-disposed cross shaft mounted in bearings on said head and provided with a rotatable crushing device, inclined spindles that project outwardly and downwardly in opposite directions from said head and which are disposed at right angles to said cross shaft, and approximately disk-shaped cutters rotatably mounted on said spindles, the edge portions of said cutters being tapered, and said cutters being provided with crushing portions that disintegrate the material at the bottom of the hole outside of the path where the sharp edges of the cutters dig into the bottom of the hole.

12. A rotary boring drill comprising a head, a rotatable crushing device on said head whose axis of rotation is disposed horizontally, and substantially plano-convex disk-shaped cutters on said head arranged in an inclined position on opposite sides of said crushing device and revolving about axes that extend at substantially right angles to the axis of rotation of said crushing device, the convexed surfaces of said cutters acting to crush the material at the bottom of the hole lying beyond the point where the sharp edges of the cutters act on the bottom of the hole.

13. A rotary boring drill comprising a head, a horizontally disposed rotatable crushing device extending transversely across the head, and substantially disk-shaped cutters on said head arranged on opposite sides of the longitudinal axis of said crushing device, said disk-shaped cutters revolving in inclined planes that converge at a point below the lower end of the head of the drill and having crushing portions that disintegrate the material at the bottom of the hole lying outside of the zone where the sharp edges of the cutters act on the bottom of the hole.

14. A rotary boring drill comprising a head provided at its lower end with a pocket and having flat side bearing faces that incline inwardly and downwardly toward the longitudinal axis of the head, spindles projecting laterally from said bearing faces, a horizontally disposed shaft in said pocket that extends cross-wise of the head at approximately right angles to said spindles, crushing rollers on said shaft that disintegrate the material at the center of the bottom of the hole, and substantially disk-shaped cutters arranged on said spindles on opposite sides of the longitudinal axis of said shaft and provided with crushing portions that disintegrate the material on the bottom of the hole lying outside of the zone where the sharp edges of the cutters dig into the bottom of the hole.

15. A rotary boring drill comprising a head, a horizontally-disposed rotatable crushing device on said head which is so shaped that it tends to center the drill in the hole and prevent it from wabbling, and substantially disk-shaped sharp edged cutters on the head arranged in inclined positions on opposite sides of the longitudinal axis of said crushing device and being of such shape in cross section that the rear sides of same will not drag against the side of the hole when the advancing sharp edges of same are shearing through the material in which the hole is being formed, said cutters having substantially convexed portions that crush the material at the bottom of the hole outside of the zone where the sharp edges of the cutters act on the bottom of the hole.

In testimony whereof I hereunto affix my signature in the presence of two witnesses, this 27th day of October, 1913.

HOWARD R. HUGHES.

Witnesses:
 BENJAMIN ANDREWS,
 E. W. TOWNES.